United States Patent
Schmalenberg et al.

(10) Patent No.: US 12,510,498 B2
(45) Date of Patent: Dec. 30, 2025

(54) MAGNETIC FIELD SENSOR CELL AND ARRAY

(71) Applicant: Toyota Motor Engineering & Manufacturing North America, Inc., Plano, TX (US)

(72) Inventors: Paul Donald Schmalenberg, Ann Arbor, MI (US); Ercan Mehmet Dede, Ann Arbor, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA, Toyota (JP)

( * ) Notice: Subject to any disclaimer, the term of this patent is extended or adjusted under 35 U.S.C. 154(b) by 159 days.

(21) Appl. No.: 18/606,844

(22) Filed: Mar. 15, 2024

(65) Prior Publication Data
US 2025/0290881 A1 Sep. 18, 2025

(51) Int. Cl.
*G01N 24/00* (2006.01)
*G01N 24/08* (2006.01)
*G01N 24/10* (2006.01)

(52) U.S. Cl.
CPC .......... *G01N 24/10* (2013.01); *G01N 24/006* (2013.01); *G01N 24/08* (2013.01)

(58) Field of Classification Search
CPC ....... G01N 24/08; G01N 24/10; G01N 24/006
See application file for complete search history.

(56) References Cited

U.S. PATENT DOCUMENTS

| | | | |
|---|---|---|---|
| 9,497,370 B2 | 11/2016 | Venkataraman et al. |
| 9,933,351 B2 | 4/2018 | Kent et al. |
| 10,883,934 B2 | 1/2021 | Mahrt et al. |
| 11,204,444 B2 | 12/2021 | Bahritdinov |

(Continued)

FOREIGN PATENT DOCUMENTS

CN 114839173 A 8/2022

OTHER PUBLICATIONS

Lillie et al., "High Resolution Soft X-Ray Spectroscopy for Constellation X", UV, X-Ray, and Gamma-Ray Space Instrumentation for Astronomy XV, edited by Oswald H. W. Siegmund, Proc. of SPIE vol. 6686, 668612, (2007) • 0277-786X/07/$18 • doi: 10.1117/12.735473, 12 pages.

*Primary Examiner* — Eman A Alkafawi
*Assistant Examiner* — Suresh K Rajaputra
(74) *Attorney, Agent, or Firm* — Jordan IP Law, LLC

(57) ABSTRACT

Technology provides for a magnetic field sensor cell including a color center arranged in a substrate, where the color center includes single-defect photon emitters, and a plurality of sector-shaped slices provided on the substrate, where each sector-shaped slice includes a body having a transparent material having a first refractive index formed into a raised sector shape having a narrow end formed into a grating structure, and a photoluminescent quantum dot placed in the body of the sector-shaped slice, where the sector-shaped slice is configured such that light from the quantum dot is reflected toward and emitted out of the narrow end, where the plurality of sector-shaped slices are arranged around the color center such that the narrow end of each slice of the plurality of slices points toward the color center. An array of magnetic field sensor cells can be arranged on the substrate.

20 Claims, 4 Drawing Sheets

(56) References Cited

U.S. PATENT DOCUMENTS

| | | | |
|---|---|---|---|
| 2017/0343621 A1* | 11/2017 | Hahn | G01R 33/1284 |
| 2018/0275212 A1* | 9/2018 | Hahn | G01R 33/032 |
| 2019/0018076 A1* | 1/2019 | Hahn | G01N 21/64 |
| 2019/0219645 A1* | 7/2019 | Hahn | G01R 33/26 |
| 2022/0102583 A1* | 3/2022 | Baumheinrich | G02B 6/12007 |
| 2023/0155079 A1* | 5/2023 | Kim | H10H 20/855 |
| | | | 257/79 |
| 2023/0185198 A1 | 6/2023 | Kagan et al. | |

* cited by examiner

MAGNETIC FIELD SENSOR CELL AND ARRAY

TECHNICAL FIELD

Embodiments generally relate to magnetic field sensors. More particularly, embodiments relate to a magnetic field sensor cell and sensor array to measure a magnetic field.

BACKGROUND

Color centers made of single-defect photon emitters (e.g., materials having quantum spin defects) emit light and are well known to be highly sensitive to magnetic fields. Prior attempts to produce magnetic field sensors using color centers generally employ a series of distributed color centers and use a mechanical scanner (e.g., nano-stepper) to scan the outputs of the color centers and produce a high spatial resolution map of the field. Use of mechanical scanners, however, results in disadvantages such as inability to sufficiently miniaturize the sensor especially for mobility-based applications.

BRIEF SUMMARY

In some embodiments, a magnetic field sensor cell includes a color center arranged in an inner portion of a substrate, wherein the color center comprises one or more single-defect photon emitters, and a plurality of sector-shaped slices provided on the substrate, wherein each sector-shaped slice of the plurality of sector-shaped slices includes a body comprising a first transparent material having a first refractive index formed into a raised sector shape having a narrow end formed into a grating structure, and a photoluminescent quantum dot placed in the body of the sector-shaped slice, wherein the sector-shaped slice is configured such that light from the quantum dot is reflected toward and emitted out of the narrow end, wherein the plurality of sector-shaped slices are arranged around the color center such that the narrow end of each slice of the plurality of slices is pointing toward the color center.

In some embodiments, an apparatus includes a substrate, and an array of magnetic field sensor cells arranged on the substrate, wherein the substrate and the array of magnetic field sensor cells arranged on the substrate includes a magnetic field sensor array, wherein each magnetic field sensor cell occupies a respective region of the substrate and includes a color center arranged in an inner portion of the respective substrate region, wherein the color center includes one or more single-defect photon emitters, and a plurality of sector-shaped slices provided on the respective substrate region, wherein each sector-shaped slice of the plurality of sector-shaped slices includes a body comprising a first transparent material having a first refractive index formed into a raised sector shape having a narrow end formed into a grating structure, and a photoluminescent quantum dot placed in the body of the sector-shaped slice, wherein the sector-shaped slice is configured such that light from the quantum dot is reflected toward and emitted out of the narrow end, wherein the plurality of sector-shaped slices are arranged around the color center such that the narrow end of each slice of the plurality of slices is pointing toward the color center.

In some embodiments, a method includes arranging a magnetic field sensor within a space having a magnetic field, supplying power to the magnetic field sensor, measuring an output of the magnetic field sensor after the power is supplied to the magnetic field sensor, and determining from the output of the magnetic field sensor a strength and direction of the magnetic field, wherein the magnetic field sensor includes a magnetic field sensor array including a substrate and an array of magnetic field sensor cells arranged on the substrate, wherein each magnetic field sensor cell occupies a respective region of the substrate and includes a color center arranged in an inner portion of the respective substrate region, wherein the color center includes one or more single-defect photon emitters, and a plurality of sector-shaped slices provided on the respective substrate region, wherein each sector-shaped slice of the plurality of sector-shaped slices includes a body comprising a first transparent material having a first refractive index formed into a raised sector shape having a narrow end formed into a grating structure, and a photoluminescent quantum dot placed in the body of the sector-shaped slice, wherein the sector-shaped slice is configured such that light from the quantum dot is reflected toward and emitted out of the narrow end, wherein the plurality of sector-shaped slices are arranged around the color center such that the narrow end of each slice of the plurality of slices is pointing toward the color center, an imaging sensor array arranged in proximity to and parallel to the magnetic field sensor array, wherein the imaging sensor array is aligned such that each pixel of the imaging sensor array is to receive light emitted from a respective magnetic field sensor cell of the magnetic field sensor array, and a power layer to provide power to the magnetic field sensor array, wherein the power layer is arranged on an opposite side of the magnetic field sensor array relative to the imaging sensor array, wherein the substrate includes a third material that is translucent or transparent.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Technology as described herein provides a magnetic field sensor cell and integrated sensor array to measure a magnetic field, by measuring an output of color sensors activated by emissions from quantum dots placed in sector-shaped slices. The magnetic field sensor array includes an array of magnetic field censor cells arranged on a substrate. Each magnetic field sensor cell includes a color center and a set of sector-shaped slices arranged around the color center such that the narrow end of each slice of the plurality of slices is pointing toward the color center. Each slice includes a quantum dot that provides a light source that is focused though the narrow end onto the color center.

In embodiments an imaging sensor array is arranged in proximity to and parallel to the magnetic field sensor array to form, along with a power layer, a magnetic field sensor. The imaging sensor array is aligned such that each pixel of the imaging sensor array is to receive light emitted from a respective magnetic field sensor cell of the magnetic field sensor array. The magnetic field strength and direction can be determined based on measuring the output of the magnetic field sensor—e.g., reading out each pixel of the imaging sensor array. The technology provides the advantages of packaging the magnetic field sensor into a small/compact integrated chip-like structure, one that can measure magnetic fields with high sensitivity without the need for a mechanical scanner.

Figure 1:
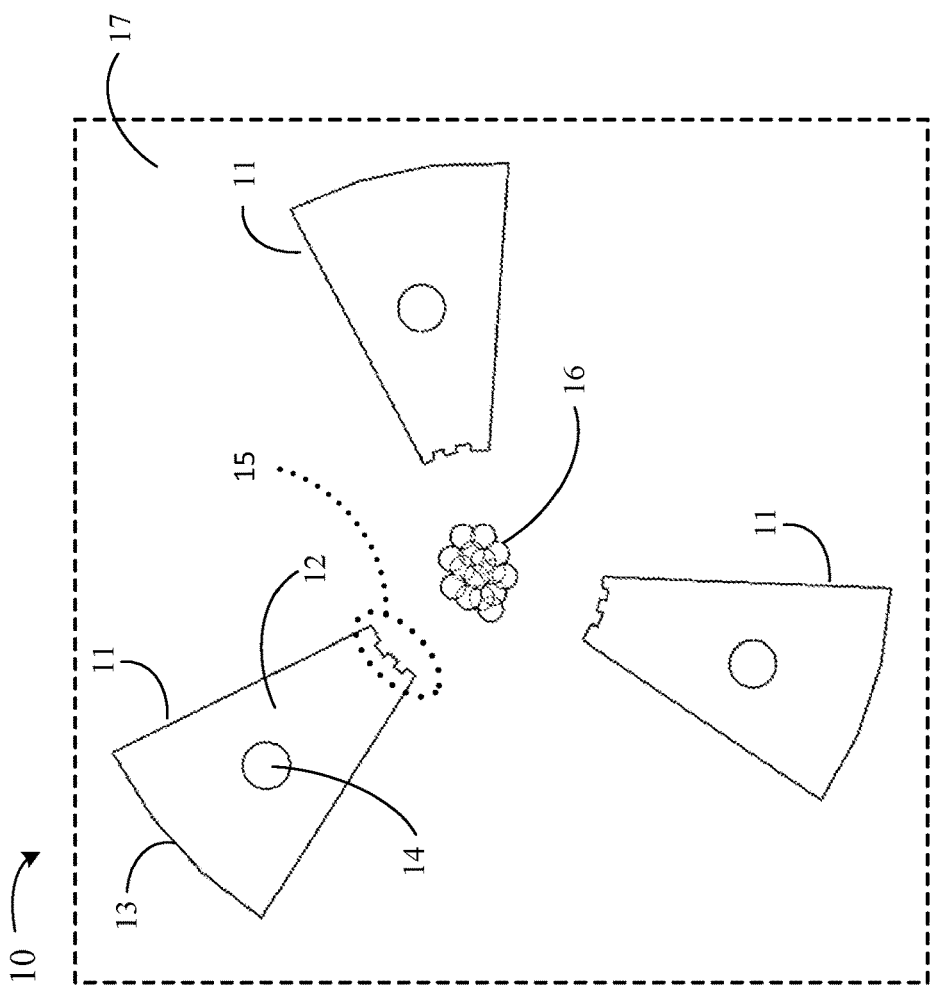
FIG. 1 provides a diagram illustrating an example of a magnetic field sensor cell according to one or more embodiments.

FIG. 1 provides a diagram illustrating an example of a magnetic field sensor cell 10 according to one or more embodiments, with reference to components and features described herein including but not limited to the figures and associated description. As shown in FIG. 1, the magnetic field sensor cell 10 includes a plurality of sector-shaped slices 11 disposed on a substrate 17 and surrounding an ensemble color center 16. Each sector-shaped slice 11 includes a photoluminescent quantum dot 14 and a body 12 made of a solid, glass-like transparent material having a first refractive index and minimal extinction coefficient for wavelengths of light produced by the quantum dot 14. The body 12 is formed into a raised sector shape (e.g., similar to the shape of a sector of a circle or a slice of a pie) having a narrow end formed into a grating structure 15. Each sector-shaped slice 11 also includes a curved portion 13 at the wide end (e.g., similar to the arc of a sector of a circle) and two sides that taper from the wide end to the narrow end. The curved portion 13 is a parabolic shape with foci at the color center.

The photoluminescent quantum dot 14 is placed in the body 12 of the sector-shaped slice 11. In some embodiments, the quantum dot 14 is fully embedded within the body 12. In some embodiments, the quantum dot 14 is not fully embedded within the body 12—e.g., a portion of the quantum dot 14 can extend above the top of the sector-shaped slice 11, but the majority of the quantum dot 14 should lie within the body 12 of the sector-shaped slice 11. When energized (e.g., by a power source/electrical signal such as DC voltage or pump light), the quantum dot 14 provides a steady, stable light source.

The raised sector shape (e.g., as illustrated in the example isometric view of FIG. 3B) provides for depth of the sector-shaped slice 11 (that is, the sector-shaped slice 11 is not flat) that provides for holding the quantum dot 14 in place. The raised sector shape also provides for reflecting and focusing light emitted from the quantum dot 14 toward and out of the narrow end of the sector-shaped slice 11 (as described further herein with reference to FIG. 2).

The transparent material of the body 12 provides for transmission and reflection of light emitted by the quantum dot 14. In some embodiments, the material of the body 12 is (or includes) silicon nitride, aluminum oxide, silicon dioxide, titanium dioxide, or tantalum pentoxide. The quantum dot 14 typically has a cylindrical-like shape and emits light omnidirectionally (e.g., in a 360 degree pattern around the circumference). The quantum dot 14 is a complex stack of active material (e.g., nanocrystals of a semiconducting material) that emits light when power (such as, e.g., a DC voltage) is applied to the quantum dot 14. The material selected for the quantum dot 14 determines the color (e.g., frequency) of light emitted. In some embodiments, the quantum dot 14 is of a selected material such that the quantum dot 14 emits green light. In some embodiments, the quantum dot 14 is of a selected material such that the quantum dot 14 emits a red light.

The grating structure 15 is located at the narrow end of the body 12 of the sector-shaped slice 11, and is made of the transparent material of the body 12. The grating structure 15 is designed with a grating pattern to emit light from the quantum dot 14, as reflected within the body 12, out of the narrow end of the sector-shaped slice 11 and to focus the light onto the color center 16. The grating pattern allows emission out of the sector-shaped slice 11 when the quantum dot 14 is energized. An example of grating technology is described in an article by Lillie et al, High-Resolution Soft X-Ray Spectroscopy For Constellation X, Proceedings of the SPIE, Volume 6686 (September 2007), which is incorporated herein by reference. Other known grating technology can be considered in determining a grating pattern for the grating structure 15.

As illustrated in FIG. 1, the sector-shaped slices 11 are arranged around the color center 16 such that the narrow end of each slice of the plurality of slices is pointing toward the color center 16. The color center 16 includes one or more single-defect photon emitter(s) up to an ensemble that are activated to emit light when a light source (e.g., light from the quantum dots) is focused on them. The single-defect photon emitter(s) are highly sensitive to magnetic fields and, thus, the intensity of light emitted by the color center 16 is typically inversely proportional to the strength of the magnetic field near the color center 16. The material of the single-defect photon emitter(s) is selected to produce light of a specific color (e.g., frequency). For example, when the single-defect photon emitter(s) include nitrogen vacancy defective diamond material, the color center 16 will emit red light when a light source is focused on it. As another example, when the single-defect photon emitter(s) include silicon carbide, the color center 16 will emit infrared light when a light source is focused on it. When more than one single-defect photon emitter is used in the color center 16, the single-defect photon emitters are densely packed together in a localized area in the magnetic field sensor cell 10.

The quantum dot 14 and the color center 16 of each sector-shaped slice 11 are selected such that the color emitted by the quantum dot 14 and the color emitted by the color center 16 are different. For example, in some embodiments when the color center 16 includes a material selected to emit red light, the quantum dot 14 includes a material selected to emit green light. As another example, in some embodiments when the color center 16 includes a material selected to emit green light, the quantum dot 14 includes a material selected to emit red light. Use of different color emissions for the quantum dot 14 and the color center 16 enables use of a color filter to filter out the light emitted by the quantum dot 14 that escapes the magnetic field sensor cell 10 while allowing transmission of light emitted by the color center 16—for example, when a plurality of magnetic field censor cells are packaged into an array along with an imaging sensor array to form a magnetic field sensor.

The substrate 17 provides a floor upon which the color center 16 is arranged and on which the plurality of sector-shaped slices are provided (e.g., placed, etched, etc.). The substrate can be made of the same material as the material of the body 12, or can be made of another material. The substrate 17 is typically made of a translucent or transparent material to permit light emitted from the color center 16 to pass through. For example, in some embodiments the substrate 17 is made of silicon dioxide; in some embodiments, the substrate 17 is made of silicon nitride; and in some embodiments, the substrate 17 is made of a combination of silicon dioxide and silicon nitride.

As illustrated in FIG. 1, the color center 16 is arranged in an inner portion of the substrate 17 (e.g., in or near the center of the area of the substrate 17). In embodiments, the color center 16 is placed directly on the substrate 17. In some embodiments, the color center 16 is placed on a pedestal that is arranged on the substrate 17. As described above and illustrated in FIG. 1, the plurality of sector-shaped slices 11 are arranged around the color center 16 such that the narrow end of each slice of the plurality of sector-shaped slices 11 is pointing toward the color center 16.

As illustrated in the example of FIG. 1, the magnetic field sensor cell 10 includes three sector-shaped slices 11. In embodiments, the magnetic field sensor cell 10 includes a number of sector-shaped slices 11 that is three, four, five or six. In some embodiments, the magnetic field sensor cell 10 includes two sector-shaped slices 11 or a number of sector-shaped slices 11 that is more than six. However, including a large number of sector-shaped slices 11 causes the sector-shaped slices 11 to be located relatively close to one another, which in turn negatively impacts the difference in refractive index needed by each sector-shaped slice 11 to cause light from the quantum dot 14 to be reflected toward the grating structure 15.

In embodiments, for a single magnetic field sensor cell 10 that is produced in isolation, the substrate 17 extends an area sufficient to provide a floor/surface to support the plurality of sector-shaped slices 11 and the color center 16 of the magnetic field sensor cell 10. In embodiments, for an array of magnetic field sensor cells (such as described further herein with reference to FIGS. 3A-3B, 4 and 5), the substrate 17 extends an area sufficient to provide a floor/surface to support all of the magnetic field sensor cells 10 that are in the array, such that each magnetic field sensor cell 10 occupies a respective substrate region (i.e., a respective region of the substrate 17).

In some embodiments, each sector-shaped slice 11 is surrounded by a fill material (not shown in FIG. 1) having a second refractive index that is lower than the first refractive index of the transparent material of the body 12. In some embodiments, the fill material occupies all or most of the open space above the substrate 17 and covers the plurality of sector-shaped slices 11. In some embodiments, the fill material is silicon dioxide (which is a glass-like material). In some embodiments, when the fill material is silicon dioxide, the transparent material of the body 12 is silicon nitride.

Figure 2:
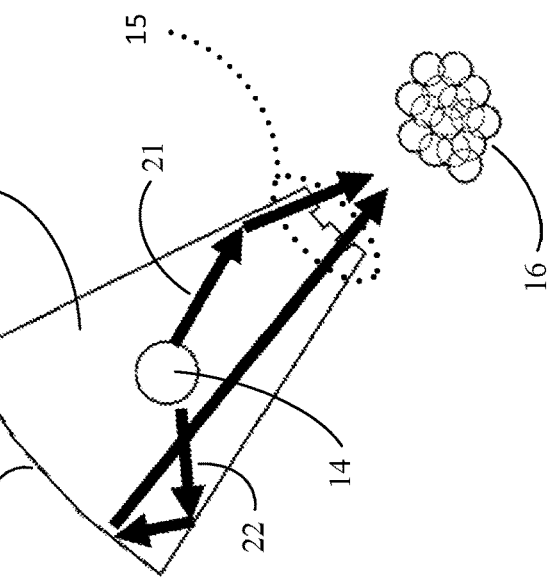
FIG. 2 provides a diagram illustrating an example of a sector-shaped slice used in a magnetic sensor cell according to one or more embodiments.

FIG. 2 provides a diagram 20 illustrating an example of a sector-shaped slice 11 used in a magnetic sensor cell according to one or more embodiments, with reference to components and features described herein including but not limited to the figures and associated description. The sector-shaped slice 11 is illustrated in operation with power (e.g., a DC voltage from a power source, not shown in FIG. 2) supplied to the photoluminescent quantum dot 14 such that the photoluminescent quantum dot 14 emits light. As illustrated in FIG. 2, a first light ray 21 is shown emitted from the quantum dot 14. The ray 21 reflects off of a side surface of the sector-shaped slice 11 and the reflected ray is directed toward the grating structure 15 where it passes out of the sector-shaped slice 11 and toward the color center 16. As further illustrated in FIG. 2, a second light ray 22 is shown emitted from the quantum dot 14. The ray 22 reflects off of another side surface of the sector-shaped slice 11 and the reflected ray is directed toward the curved portion 13, where it is reflected again toward the grating structure 15. The ray 22 then passes out of the sector-shaped slice 11 through the grating structure 15 and toward the color center 16.

Light rays (such as the ray 21 and the ray 22) that are emitted by the quantum dot 14 are reflected once they hit the sides or curved portion 13 of the sector-shaped slice 11 due to the difference in refractive index between the first refractive index of the transparent material of the body 12 and the surrounds of the sector-shaped slice 11. For example, if there is no fill material (such that air or a gas surrounds the sector-shaped slice 11), the first refractive index of the transparent material of the body 12 is greater than the refractive index of the air or gas, such that the light will reflect within the interior of the sector-shaped slice 11 until the light is directed though the grating structure 15 and toward the color center 16. As another example, in embodiments where a fill material surrounds the sector-shaped slice 11, the fill material is selected to have a second refractive index that is lower than the first refractive index of the transparent material of the body 12. In embodiments, the body shape is designed such that—considering omnidirectional emission from the quantum dot—a large majority of first reflection angles satisfy the Brewster angle for total internal reflection. Thus, as illustrated in FIG. 2, the sector-shaped slice 11 is configured such that at least most of the light from the quantum dot 14 is reflected toward and emitted out of the narrow end of the sector-shaped slice 11.

Figure 3A:
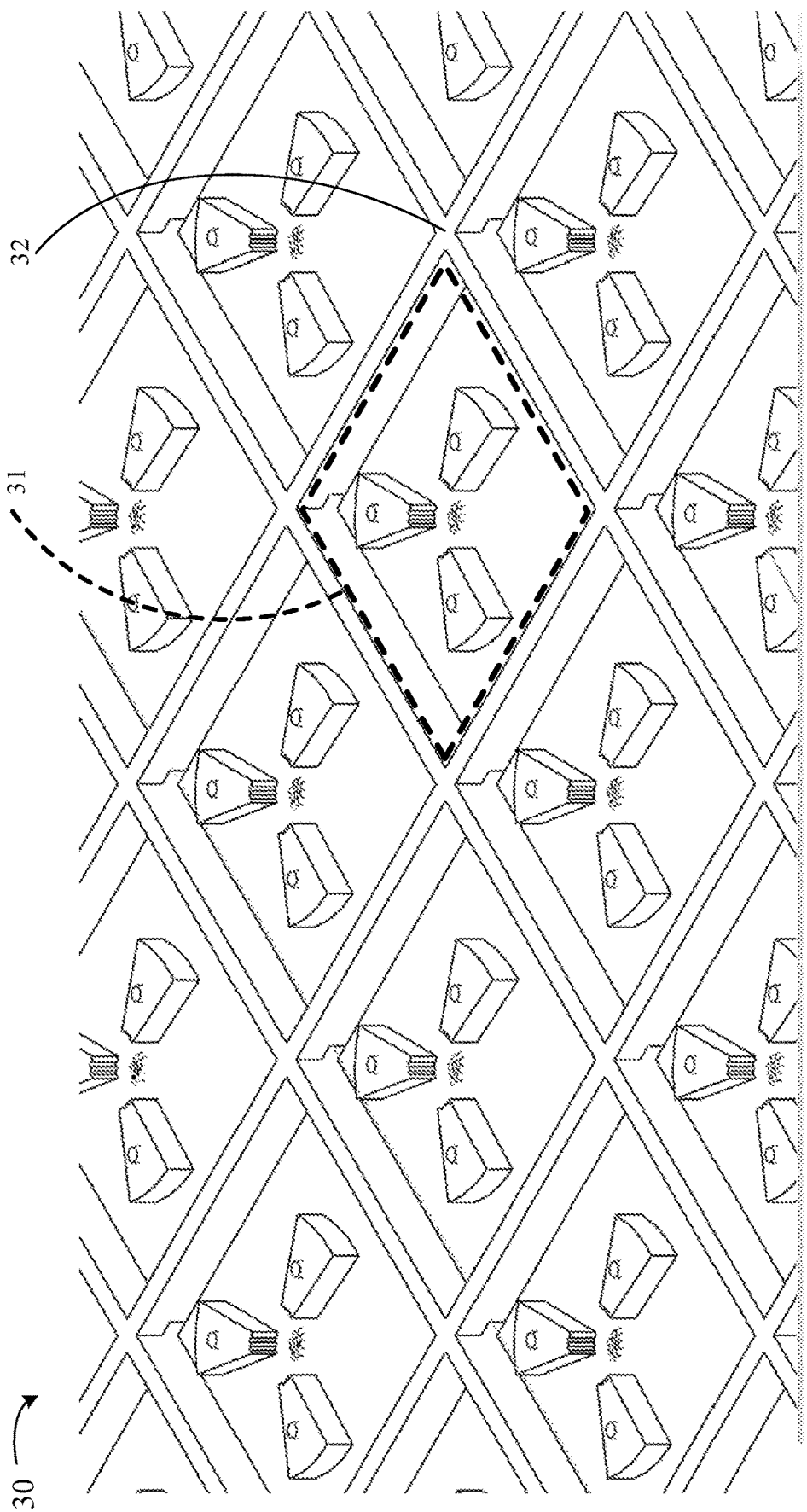
FIG. 3A provides an isometric-view diagram illustrating an example of a magnetic field sensor array of magnetic field sensor cells according to one or more embodiments.

FIG. 3A provides an isometric-view diagram illustrating an example of a magnetic field sensor array 30 of magnetic field sensor cells according to one or more embodiments, with reference to components and features described herein including but not limited to the figures and associated description. The magnetic field sensor array 30 includes a plurality of magnetic field sensor cells, such as the magnetic field sensor cell 31. The magnetic field sensor cells are arranged in a tile-like (or grid-like) array on a substrate (e.g., the substrate 17 in FIG. 1, already discussed), such that each magnetic field sensor cell occupies a respective region of the substrate (i.e., respective substrate region). For example, the magnetic field sensor array 30 can include multiple rows and multiple columns of magnetic field sensor cells.

In some embodiments, the magnetic field sensor array 30 includes a set of light blocks (e.g., baffles or other light-blocking structures) 32 that surround each magnetic field sensor cell. The light blocks can, e.g., be etched or raised areas of material. The set of light blocks 32 provide for isolating each magnetic field sensor cell from the other magnetic field sensor cells in the magnetic field sensor array 30, such that light emitted from one magnetic field sensor cell does not pass through to other magnetic field sensor cells. In some embodiments, the light blocks 32 include an opaque material to block light. In other embodiments, the light blocks 32 are of the same transparent material as either the substrate or the sector slices, where the Brewster angle design blocks most of the light despite the light blocks 32 being of transparent material. In some embodiments, the magnetic field sensor array 30 includes a layer on top (e.g., over top of the light blocks 32) to prevent externally-sourced light from entering the magnetic field sensor cells.

Figure 3B:
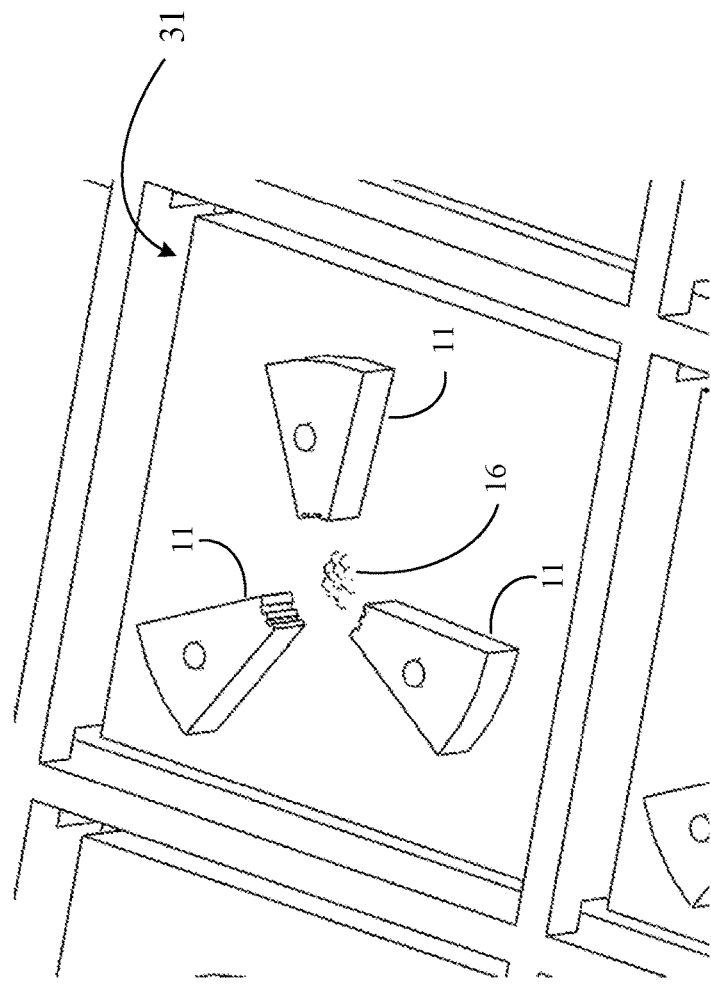
FIG. 3B provides an isometric-view diagram illustrating an example of a magnetic field sensor cell within an array according to one or more embodiments.

Turning now to FIG. 3B, shown is an isometric-view diagram illustrating an example of a magnetic field sensor cell 31 within a magnetic field sensor array (such as the magnetic field sensor array) according to one or more embodiments, with reference to components and features described herein including but not limited to the figures and associated description. The magnetic field sensor cell 31 corresponds to the magnetic field sensor cell 10 (FIG. 1, already discussed). As illustrated in the isometric view of FIG. 3B, the magnetic field sensor cell 31 includes three sector-shaped slices 11 and a color center 16 on a substrate region. The isometric view further illustrates the raised sector shape of each sector-shaped slice 11.

Figure 4:
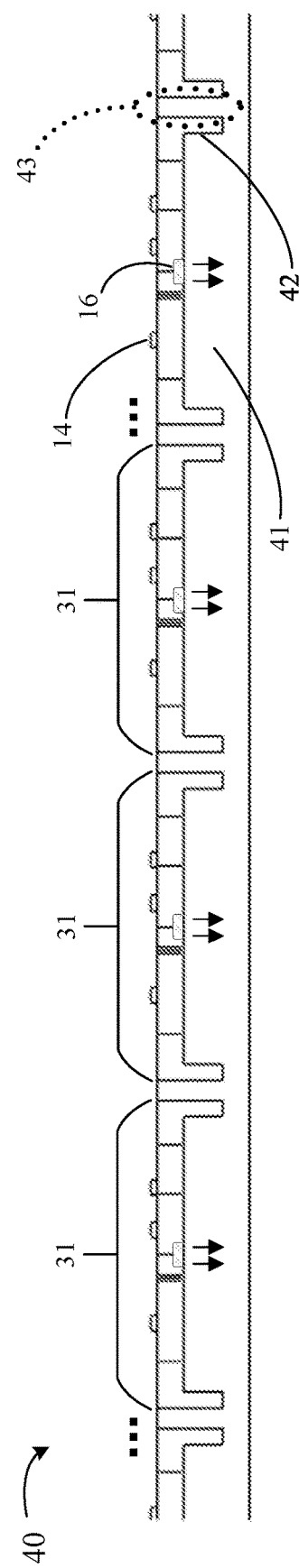
FIG. 4 provides a side-view diagram illustrating an example of an array of magnetic field sensor cells according to one or more embodiments.

FIG. 4 provides a side-view diagram illustrating an example of an array 40 of magnetic field sensor cells 31 according to one or more embodiments, with reference to components and features described herein including but not limited to the figures and associated description. The array 40 corresponds to a row or column of the magnetic field sensor array 30. The array 40 includes a substrate 41, where each magnetic field sensor cell 31 occupies a respective substrate region (i.e., a respective region of the substrate 41). Each magnetic field sensor cell 31 includes a color center 16 and a plurality of sector-shaped slices, each having a quantum dot 14.

The substrate 41 is made of a translucent or transparent material, and corresponds to the substrate 17 (FIG. 1, already discussed). The substrate can be manufactured e.g., on a wafer and can be etched (e.g., via nano-lithography). When illuminated by light from the sector-shaped slices in the cell, the color center 16 emits light of an intensity that is inversely proportional to the magnetic field strength near the color center 16. Light from the color center 16 is emitted downward through the substrate 41. In embodiments, a trench 42 surrounds each magnetic field sensor cell 31 to enhance light isolation between cells. Next to the trench 42 is a wall 43, with the height of the wall 43 extending up to or above the sector-shaped slices 11 to further enhance light isolation. The wall 43 is part of a light block (e.g., the light block 32 described above with reference to FIG. 3A.)

Figure 5:
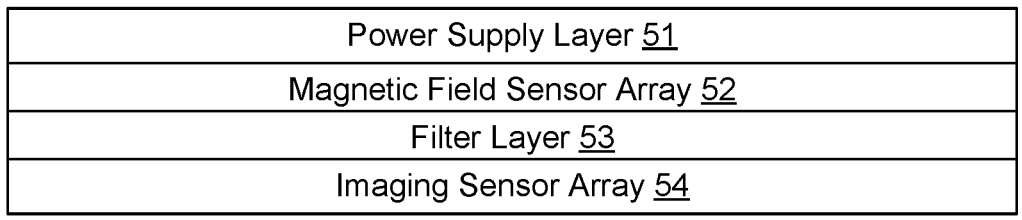
FIG. 5 provides a diagram illustrating an example of a magnetic field sensor according to one or more embodiments.

FIG. 5 provides a block diagram illustrating an example of a magnetic field sensor 50 according to one or more embodiments, with reference to components and features described herein including but not limited to the figures and associated description. The magnetic field sensor 50 includes a power supply layer 51, a magnetic field sensor array 52, and an imaging sensor array 54. The magnetic field sensor array 52 corresponds to the magnetic field sensor array 30 of magnetic field sensor cells (FIGS. 3A-3B, already discussed). The power supply layer 51 provides a power source (e.g., DC voltage) to the magnetic field sensor array 52, including power to each of the magnetic field sensor cells (e.g., to the quantum dots in each of the sector-shaped slices in each cell). The power supply layer 51 can include a power integrated circuit as a power source and/or leads, electrodes etc. providing power connections between the power source and the other components of the magnetic field sensor 50. The power supply layer can also include data lines. The power supply layer 51 is typically placed over the upper side of the magnetic field sensor array 52, which serves to prevent externally-sourced light from entering the magnetic field sensor cells.

The imaging sensor array 54 is an array of light sensors, such as, e.g., a complementary metal-oxide-semiconductor (CMOS) imaging array or charge-coupled device (CCD) imaging array, having individual elements (i.e., pixels) whose photoluminescence can be read out. The imaging sensor array 54 is arranged (e.g., mounted) in proximity to and parallel to the magnetic field sensor array 52, on the side of the magnetic field sensor array 52 where light from the color centers of the cells is emitted through the substrate. The imaging sensor array 54 is aligned such that each pixel of the imaging sensor array 54 receives light emitted from a respective magnetic field sensor cell of the magnetic field sensor array 52. For example, the size (e.g., area) of each magnetic field sensor cell should match (at least approximately) the size (e.g., area) of each pixel of the imaging sensor array 54, and the spacing of magnetic field sensor cells should match the spacing of pixels in the imaging sensor array 54. Additionally, the number of rows and columns of magnetic field sensor cells in the magnetic field sensor array 52 should match the number of rows and columns of pixels in the imaging sensor array 54. Thus, the pitch of magnetic field sensor cells in the magnetic field sensor array 52 should match the pitch of pixels in the imaging sensor array 54.

In some embodiments, the magnetic field sensor 50 includes an optional filter layer 53. The filter layer 53 is arranged between the magnetic field sensor array 52 and the imaging sensor array 54. The filter layer 53 includes a filter material selected to permit light from the color centers to pass through the filter layer 53 (and onto the imaging sensor array 54) and to block light from the quantum dots of the magnetic field sensor cells. As one example, if the color centers emit red light and the quantum dots emit green light, the filter material is selected (e.g., a red filter) to permit the red light from the color centers to pass through and to block the green light from the quantum dots. As another example, if the color centers emit green light and the quantum dots emit red light, the filter material is selected (e.g., a green filter) to permit the green light from the color centers to pass through and to block the red light from the quantum dots. In some embodiments without a filter layer 53, the imaging sensor array 54 is arranged (e.g., mounted) immediately adjacent to the magnetic field sensor array 52.

Figure 6:
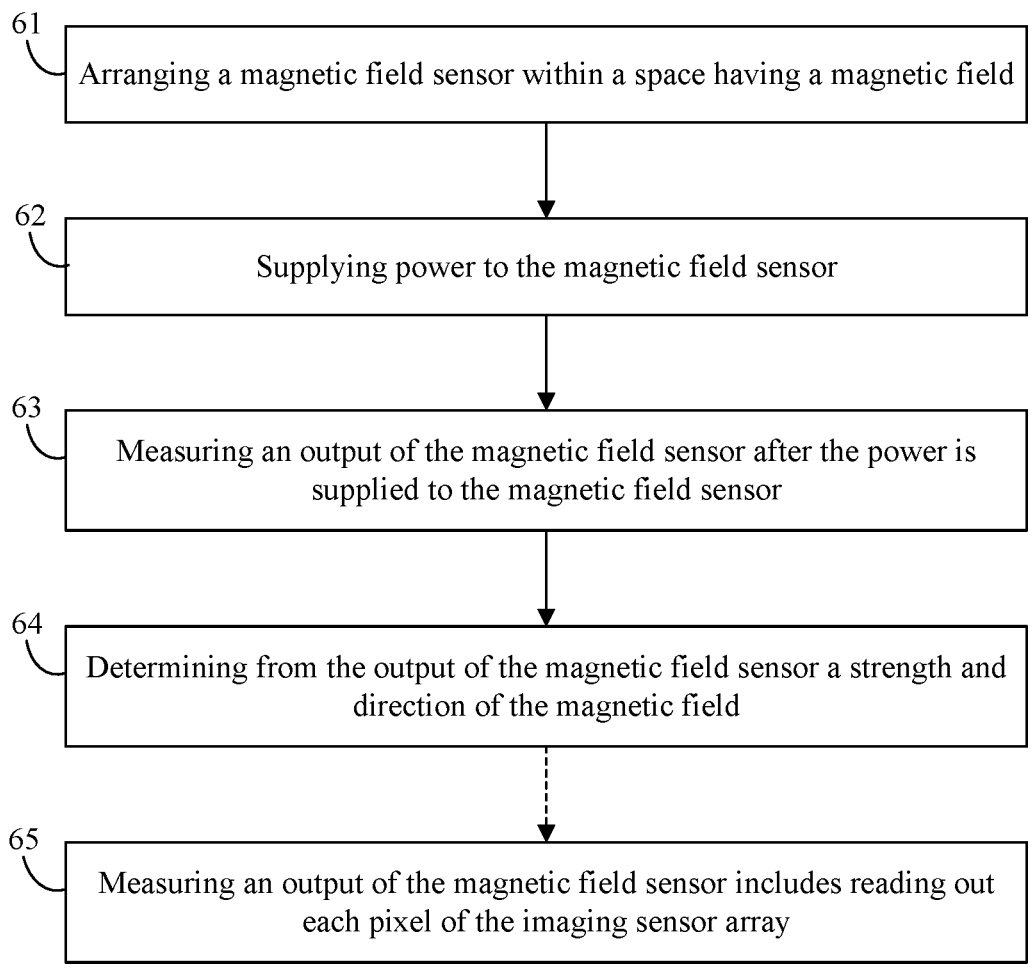
FIG. 6 provides a flow diagram illustrating an example method of operating a magnetic field sensor according to one or more embodiments.

FIG. 6 provides a flow diagram illustrating an example method 60 of operating a magnetic field sensor (such as, e.g., the magnetic field sensor 50 of FIG. 5) according to one or more embodiments, with reference to components and features described herein including but not limited to the figures and associated description. All or part of the method 60 can be implemented as one or more modules as a set of program or logic instructions stored in a machine- or computer-readable storage medium such as random access memory (RAM), read only memory (ROM), programmable ROM (PROM), firmware, flash memory, etc., in hardware, or any combination thereof. For example, hardware implementations can include configurable logic, fixed-functionality logic, or any combination thereof. Examples of configurable logic include suitably configured programmable logic arrays (PLAs), FPGAS, complex programmable logic devices (CPLDs), and general purpose microprocessors. Examples of fixed-functionality logic include suitably configured ASICs, combinational logic circuits, and sequential logic circuits. The configurable or fixed-functionality logic can be implemented with complementary metal oxide semiconductor (CMOS) logic circuits, transistor-transistor logic (TTL) logic circuits, or other circuits.

For example, computer program code to carry out operations shown in the method 60 and/or functions associated therewith can be written in any combination of one or more programming languages, including an object-oriented programming language such as Java, JavaScript, Python, C#, C++, Perl, Smalltalk, or the like and conventional procedural programming languages, such as the "C" programming language or similar programming languages. Additionally, program or logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Block 61 provides for arranging a magnetic field sensor within a space having a magnetic field. Block 62 provides for supplying power to the magnetic field sensor. Block 63 provides for measuring an output of the magnetic field sensor after the power is supplied to the magnetic field sensor. Block 64 provides for determining from the output of the magnetic field sensor a strength and direction of the magnetic field. In some embodiments, at block 65 measuring an output of the magnetic field sensor includes reading out each pixel of the imaging sensor array.

The magnetic field sensor (such as the magnetic field sensor 50) that is operated via the method 60 includes a substrate and an array of magnetic field sensor cells arranged on the substrate, where each magnetic field sensor cell occupies a respective region of the substrate and includes: a color center arranged in an inner portion of the respective substrate region, where the color center comprises one or more single-defect photon emitters, and a plurality of sector-shaped slices provided on the respective substrate region, where each sector-shaped slice of the plurality of sector-shaped slices includes: a body comprising a first transparent material having a first refractive index formed into a raised sector shape having a narrow end formed into a grating structure, and a photoluminescent quantum dot placed in the body of the sector-shaped slice, where the sector-shaped slice is configured such that light from the quantum dot is reflected toward and emitted out of the narrow end, where the plurality of sector-shaped slices are arranged around the color center such that the narrow end of each slice of the plurality of slices is pointing toward the color center. The substrate includes a translucent or transparent material.

The magnetic field sensor further includes an imaging sensor array arranged in proximity to and parallel to the magnetic field sensor array, where the imaging sensor array is aligned such that each pixel of the imaging sensor array is to receive light emitted from a respective magnetic field sensor cell of the magnetic field sensor array, and a power layer to provide power to the magnetic field sensor array, where the power layer is arranged on an opposite side of the magnetic field sensor array relative to the imaging sensor array. In some embodiments, measuring an output of the magnetic field sensor includes reading out each pixel of the imaging sensor array. In some embodiments, the magnetic field sensor further includes a filter layer arranged between the magnetic field sensor array and the imaging sensor array, where the filter layer comprises a filter material selected to permit light from the color centers to pass through the filter layer and to block light from the quantum dots.

In operation, the magnetic field sensor (such as, e.g., the magnetic field sensor 50) can be used to measure steady-state magnetic fields or magnetic fields varying at a low frequency. The range of frequencies of magnetic field variation that the magnetic field sensor can measure is limited by the response time of the imaging sensor array used in the magnetic field sensor.

Additional Notes and Examples

Example C1 includes a magnetic field sensor cell comprising a color center arranged in an inner portion of a substrate, wherein the color center comprises one or more single-defect photon emitters, and a plurality of sector-shaped slices provided on the substrate, wherein each sector-shaped slice of the plurality of sector-shaped slices comprises a body comprising a first transparent material having a first refractive index formed into a raised sector shape having a narrow end formed into a grating structure, and a photoluminescent quantum dot placed in the body of the sector-shaped slice, wherein the sector-shaped slice is configured such that light from the quantum dot is reflected toward and emitted out of the narrow end, wherein the plurality of sector-shaped slices are arranged around the color center such that the narrow end of each slice of the plurality of slices is pointing toward the color center.

Example C2 includes the magnetic field sensor cell of Example C1, wherein the sector-shaped slice is surrounded by a second material having a second refractive index that is lower than the first refractive index.

Example C3 includes the magnetic field sensor cell of Example C1 or C2, wherein the first transparent material is silicon nitride, and wherein the second material is silicon dioxide.

Example C4 includes the magnetic field sensor cell of any of Examples C1-C3, wherein the plurality of sector-shaped slices is a number of sector-shaped slices within a range of three to six slices.

Example C5 includes the magnetic field sensor cell of any of Examples C1-C4, wherein the one or more single-defect photon emitters comprises nitrogen vacancy defective diamond material, and wherein the quantum dot comprises a material that emits green light.

Example C6 includes the magnetic field sensor cell of any of Examples C1-C5, wherein the one or more single-defect photon emitters comprises silicon carbide.

Example A1 includes an apparatus comprising a substrate, and an array of magnetic field sensor cells arranged on the substrate, wherein the substrate and the array of magnetic field sensor cells arranged on the substrate comprises a magnetic field sensor array, wherein each magnetic field sensor cell occupies a respective region of the substrate and comprises a color center arranged in an inner portion of the respective substrate region, wherein the color center comprises one or more single-defect photon emitters, and a plurality of sector-shaped slices provided on the respective substrate region, wherein each sector-shaped slice of the plurality of sector-shaped slices comprises a body comprising a first transparent material having a first refractive index formed into a raised sector shape having a narrow end formed into a grating structure, and a photoluminescent quantum dot placed in the body of the sector-shaped slice, wherein the sector-shaped slice is configured such that light from the quantum dot is reflected toward and emitted out of the narrow end, wherein the plurality of sector-shaped slices are arranged around the color center such that the narrow end of each slice of the plurality of slices is pointing toward the color center.

Example A2 includes the apparatus of Example A1, wherein each magnetic field sensor cell is isolated from the other magnetic field sensor cells in the magnetic field sensor array via a light block or baffle.

Example A3 includes the apparatus of Example A1 or A2, further comprising an imaging sensor array arranged in proximity to and parallel to the magnetic field sensor array, wherein the imaging sensor array is aligned such that each pixel of the imaging sensor array is to receive light emitted from a respective magnetic field sensor cell of the magnetic field sensor array, and a power layer to provide power to the magnetic field sensor array, wherein the power layer is arranged on an opposite side of the magnetic field sensor array relative to the imaging sensor array, wherein the substrate comprises a third material that is translucent or transparent.

Example A4 includes the apparatus of any of Examples A1-A3, further comprising a filter layer arranged between the magnetic field sensor array and the imaging sensor array, wherein the filter layer comprises a filter material selected to permit light from the color centers to pass through the filter layer and to block light from the quantum dots.

Example A5 includes the apparatus of any of Examples A1-A4, wherein the sector-shaped slice is surrounded by a second material having a second refractive index that is lower than the first refractive index.

Example A6 includes the apparatus of any of Examples A1-A5, wherein the first transparent material is silicon nitride, and wherein the second material is silicon dioxide.

Example A7 includes the apparatus of any of Examples A1-A6, wherein the plurality of sector-shaped slices is a number of sector-shaped slices within a range of three to six slices.

Example A8 includes the apparatus of any of Examples A1-A7, wherein the one or more single-defect photon emitters comprises nitrogen vacancy defective diamond material, and wherein the quantum dot comprises a material that emits green light.

Example A9 includes the apparatus of any of Examples A1-A8, wherein the one or more single-defect photon emitters comprises silicon carbide.

Example M1 includes a method comprising arranging a magnetic field sensor within a space having a magnetic field, supplying power to the magnetic field sensor, measuring an output of the magnetic field sensor after the power is supplied to the magnetic field sensor, and determining from the output of the magnetic field sensor a strength and direction of the magnetic field, wherein the magnetic field sensor comprises a magnetic field sensor array comprising a substrate and an array of magnetic field sensor cells arranged on the substrate, wherein each magnetic field sensor cell occupies a respective region of the substrate and comprises a color center arranged in an inner portion of the respective substrate region, wherein the color center comprises one or more single-defect photon emitters, and a plurality of sector-shaped slices provided on the respective substrate region, wherein each sector-shaped slice of the plurality of sector-shaped slices comprises a body comprising a first transparent material having a first refractive index formed into a raised sector shape having a narrow end formed into a grating structure, and a photoluminescent quantum dot placed in the body of the sector-shaped slice, wherein the sector-shaped slice is configured such that light from the quantum dot is reflected toward and emitted out of the narrow end, wherein the plurality of sector-shaped slices are arranged around the color center such that the narrow end of each slice of the plurality of slices is pointing toward the color center, an imaging sensor array arranged in proximity to and parallel to the magnetic field sensor array, wherein the imaging sensor array is aligned such that each pixel of the imaging sensor array is to receive light emitted from a respective magnetic field sensor cell of the magnetic field sensor array, and a power layer to provide power to the magnetic field sensor array, wherein the power layer is arranged on an opposite side of the magnetic field sensor array relative to the imaging sensor array, wherein the substrate comprises a third material that is translucent or transparent.

Example M2 includes the method of Example M1, wherein measuring an output of the magnetic field sensor comprises reading out each pixel of the imaging sensor array.

Example M3 includes the method of Example M1 or M2, wherein the magnetic field sensor further comprises a filter layer arranged between the magnetic field sensor array and the imaging sensor array, wherein the filter layer comprises a filter material selected to permit light from the color centers to pass through the filter layer and to block light from the quantum dots.

Example M4 includes the method of any of Examples M1-M3, wherein the sector-shaped slice is surrounded by a second material having a second refractive index that is lower than the first refractive index.

Example M5 includes the method of any of Examples M1-M4, wherein the one or more single-defect photon emitters comprises one of a nitrogen vacancy defective diamond material or silicon carbide.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), solid state drive (SSD)/NAND drive controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections, including logical connections via intermediate components (e.g., device A may be coupled to device C via device B). In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A, B, C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A magnetic field sensor cell comprising:
   a color center arranged in an inner portion of a substrate, wherein the color center comprises one or more single-defect photon emitters; and
   a plurality of sector-shaped slices provided on the substrate, wherein each sector-shaped slice of the plurality of sector-shaped slices comprises:
      a body comprising a first transparent material having a first refractive index formed into a raised sector shape having a narrow end formed into a grating structure; and
      a photoluminescent quantum dot placed in the body of the sector-shaped slice,
      wherein the sector-shaped slice is configured such that light from the quantum dot is reflected toward and emitted out of the narrow end;
   wherein the plurality of sector-shaped slices are arranged around the color center such that the narrow end of each slice of the plurality of slices is pointing toward the color center.

2. The magnetic field sensor cell of claim 1, wherein the sector-shaped slice is surrounded by a second material having a second refractive index that is lower than the first refractive index.

3. The magnetic field sensor cell of claim 2, wherein the first transparent material is silicon nitride, and wherein the second material is silicon dioxide.

4. The magnetic field sensor cell of claim 1, wherein the plurality of sector-shaped slices is a number of sector-shaped slices within a range of three to six slices.

5. The magnetic field sensor cell of claim 1, wherein the one or more single-defect photon emitters comprises nitrogen vacancy defective diamond material, and wherein the quantum dot comprises a material that emits green light.

6. The magnetic field sensor cell of claim 1, wherein the one or more single-defect photon emitters comprises silicon carbide.

7. An apparatus comprising:
   a substrate; and
   an array of magnetic field sensor cells arranged on the substrate, wherein the substrate and the array of magnetic field sensor cells arranged on the substrate comprises a magnetic field sensor array;
   wherein each magnetic field sensor cell occupies a respective region of the substrate and comprises:
      a color center arranged in an inner portion of the respective substrate region, wherein the color center comprises one or more single-defect photon emitters; and
      a plurality of sector-shaped slices provided on the respective substrate region, wherein each sector-shaped slice of the plurality of sector-shaped slices comprises:
         a body comprising a first transparent material having a first refractive index formed into a raised sector shape having a narrow end formed into a grating structure; and
         a photoluminescent quantum dot placed in the body of the sector-shaped slice,
         wherein the sector-shaped slice is configured such that light from the quantum dot is reflected toward and emitted out of the narrow end;
      wherein the plurality of sector-shaped slices are arranged around the color center such that the narrow end of each slice of the plurality of slices is pointing toward the color center.

8. The apparatus of claim 7, wherein each magnetic field sensor cell is isolated from the other magnetic field sensor cells in the magnetic field sensor array via a light block or baffle.

9. The apparatus of claim 7, further comprising:
   an imaging sensor array arranged in proximity to and parallel to the magnetic field sensor array, wherein the imaging sensor array is aligned such that each pixel of the imaging sensor array is to receive light emitted from a respective magnetic field sensor cell of the magnetic field sensor array; and
   a power layer to provide power to the magnetic field sensor array, wherein the power layer is arranged on an opposite side of the magnetic field sensor array relative to the imaging sensor array;
   wherein the substrate comprises a third material that is translucent or transparent.

10. The apparatus of claim 9, further comprising a filter layer arranged between the magnetic field sensor array and the imaging sensor array, wherein the filter layer comprises a filter material selected to permit light from the color centers to pass through the filter layer and to block light from the quantum dots.

11. The apparatus of claim 7, wherein the sector-shaped slice is surrounded by a second material having a second refractive index that is lower than the first refractive index.

12. The apparatus of claim 11, wherein the first transparent material is silicon nitride, and wherein the second material is silicon dioxide.

13. The apparatus of claim 7, wherein the plurality of sector-shaped slices is a number of sector-shaped slices within a range of three to six slices.

14. The apparatus of claim 7, wherein the one or more single-defect photon emitters comprises nitrogen vacancy defective diamond material, and wherein the quantum dot comprises a material that emits green light.

15. The apparatus of claim 7, wherein the one or more single-defect photon emitters comprises silicon carbide.

16. A method comprising:
   arranging a magnetic field sensor within a space having a magnetic field;
   supplying power to the magnetic field sensor;
   measuring an output of the magnetic field sensor after the power is supplied to the magnetic field sensor; and
   determining from the output of the magnetic field sensor a strength and direction of the magnetic field;
   wherein the magnetic field sensor comprises:
      a magnetic field sensor array comprising a substrate and an array of magnetic field sensor cells arranged on the substrate, wherein each magnetic field sensor cell occupies a respective region of the substrate and comprises:
  a color center arranged in an inner portion of the respective substrate region, wherein the color center comprises one or more single-defect photon emitters; and
  a plurality of sector-shaped slices provided on the respective substrate region, wherein each sector-shaped slice of the plurality of sector-shaped slices comprises:
    a body comprising a first transparent material having a first refractive index formed into a raised sector shape having a narrow end formed into a grating structure; and
    a photoluminescent quantum dot placed in the body of the sector-shaped slice,
    wherein the sector-shaped slice is configured such that light from the quantum dot is reflected toward and emitted out of the narrow end;
  wherein the plurality of sector-shaped slices are arranged around the color center such that the narrow end of each slice of the plurality of slices is pointing toward the color center;
an imaging sensor array arranged in proximity to and parallel to the magnetic field sensor array, wherein the imaging sensor array is aligned such that each pixel of the imaging sensor array is to receive light emitted from a respective magnetic field sensor cell of the magnetic field sensor array; and
a power layer to provide power to the magnetic field sensor array, wherein the power layer is arranged on an opposite side of the magnetic field sensor array relative to the imaging sensor array;
wherein the substrate comprises a third material that is translucent or transparent.

17. The method of claim 16, wherein measuring an output of the magnetic field sensor comprises reading out each pixel of the imaging sensor array.

18. The method of claim 16, wherein the magnetic field sensor further comprises a filter layer arranged between the magnetic field sensor array and the imaging sensor array, wherein the filter layer comprises a filter material selected to permit light from the color centers to pass through the filter layer and to block light from the quantum dots.

19. The method of claim 16, wherein the sector-shaped slice is surrounded by a second material having a second refractive index that is lower than the first refractive index.

20. The method of claim 16, wherein the one or more single-defect photon emitters comprises one of a nitrogen vacancy defective diamond material or silicon carbide.

* * * * *